(12) United States Patent
Takeuchi et al.

(10) Patent No.: US 8,506,179 B2
(45) Date of Patent: Aug. 13, 2013

(54) DEFORMABLE PLASTIC RADIALLY SYMMETRIC MECHANICAL SPLICERS AND CONNECTORS FOR OPTICAL FIBERS

(75) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 229 days.

(21) Appl. No.: 13/187,666

(22) Filed: Jul. 21, 2011

(65) Prior Publication Data

US 2013/0022324 A1    Jan. 24, 2013

(51) Int. Cl.
*G02B 6/255* (2006.01)

(52) U.S. Cl.
USPC ............. 385/99; 385/100; 385/134; 385/135; 385/136; 385/137

(58) Field of Classification Search
USPC ................. 385/95, 96, 97, 99, 100, 134, 135, 385/136, 137
See application file for complete search history.

(56) References Cited

U.S. PATENT DOCUMENTS

| | | | |
|---|---|---|---|
| 4,325,607 A | 4/1982 | Carlsen | |
| 4,940,307 A | 7/1990 | Aberson et al. | |
| 5,121,456 A | 6/1992 | Essert et al. | |
| 5,395,025 A | 3/1995 | Borer et al. | |
| 5,450,517 A | 9/1995 | Essert | |
| 5,812,718 A | 9/1998 | Carpenter et al. | |
| 6,033,124 A | 3/2000 | Lesueur et al. | |
| 6,122,936 A | 9/2000 | Csipkes et al. | |
| 6,203,213 B1 | 3/2001 | Seo et al. | |
| 6,325,547 B1 | 12/2001 | Cammons et al. | |
| 6,572,743 B2 | 6/2003 | Miller et al. | |
| 6,742,936 B1 | 6/2004 | Knecht et al. | |
| 6,955,479 B2 | 10/2005 | Erdman et al. | |
| 7,014,372 B2 | 3/2006 | Watte et al. | |
| 7,216,512 B2 | 5/2007 | Danley et al. | |
| 7,270,487 B2 | 9/2007 | Billman et al. | |

(Continued)

FOREIGN PATENT DOCUMENTS

JP      10-039161      2/1998
WO    WO-99-27392    6/1999

(Continued)

OTHER PUBLICATIONS

International Search Report for PCT/US2012/043803, mailed Dec. 28, 2012.

(Continued)

*Primary Examiner* — Jennifer Doan
(74) *Attorney, Agent, or Firm* — White & Case LLP (57) ABSTRACT

Radially symmetric splicer joint and locking assemblies and connectors for optical fibers are provided. The assemblies use splicer joints formed from a slightly deformable plastic material. The splicer joints contain an axial bore having a diameter slightly less then the diameter of the stripped ends the optical fibers inserted into the axial bore. When a stripped fiber is inserted into the axial bore of the splicer joint, the bore expands slightly to frictionally receive the stripped end. The assemblies and connectors use radially symmetric locking to secure the fibers therein. The radially symmetric locking and the surface tension provided by the axial bore against the stripped ends of the fibers minimizes the occurrence of misalignment and reduces insertion and return losses.

26 Claims, 6 Drawing Sheets

(56) References Cited

U.S. PATENT DOCUMENTS

| | | | |
|---|---|---|---|
| 7,369,738 B2 | 5/2008 | Larson et al. | |
| 7,572,064 B2 * | 8/2009 | deJong | 385/65 |
| 7,637,673 B2 | 12/2009 | Oike et al. | |
| 7,658,549 B2 | 2/2010 | Elkins et al. | |
| 7,680,384 B2 * | 3/2010 | Billman et al. | 385/134 |
| 7,712,974 B2 | 5/2010 | Yazaki et al. | |
| 7,822,309 B2 | 10/2010 | Bianchi | |
| 8,371,761 B2 * | 2/2013 | Heidler et al. | 385/53 |
| 2002/0031323 A1 | 3/2002 | Hattori et al. | |
| 2003/0081910 A1 | 5/2003 | Gimbel et al. | |
| 2006/0263028 A1 | 11/2006 | Honma | |
| 2009/0162019 A1 | 6/2009 | Lichoulas et al. | |
| 2011/0091166 A1 | 4/2011 | Benjamin et al. | |
| 2012/0328251 A1 | 12/2012 | Takeuchi et al. | |
| 2013/0008594 A1 | 1/2013 | Takeuchi et al. | |
| 2013/0022324 A1 | 1/2013 | Takeuchi et al. | |

FOREIGN PATENT DOCUMENTS

| | | |
|---|---|---|
| WO | WO-02-074505 | 9/2002 |
| WO | WO-03-003087 | 1/2003 |
| WO | WO 2012-178050 | 12/2012 |
| WO | WO 2013-006646 | 1/2013 |
| WO | WO 2013-012559 | 1/2013 |

OTHER PUBLICATIONS

Written Opinion for PCT/US2012/043803, mailed Dec. 28, 2012.
International Search Report for PCT/US2012/045457, mailed Jan. 3, 2013.
Written Opinion for PCT/US2012/045457, mailed Jan. 3, 2013.
International Search Report for PCT/US2012/045461, mailed Jan. 3, 2013.
Written Opinion for PCT/US2012/045461, mailed Jan. 3, 2013.

* cited by examiner

DEFORMABLE PLASTIC RADIALLY SYMMETRIC MECHANICAL SPLICERS AND CONNECTORS FOR OPTICAL FIBERS

FIELD OF THE INVENTION

The present invention relates to the field of fiber optics and terminations for optical fibers, particularly mechanical splicer joints for connecting the exposed ends of optical fibers. This application applies to the termination of both flat or angle cleaved fiber ends joined in a pre-made deformable and stretchable-compressible ferrule for connecting fiber stub assemblies to field fibers. In particular, the present invention provides deformable plastic radially symmetric splicer joints and locking assemblies for mechanically splicing optical fibers and for connecting field optical fibers to ultra physical contact (UPC) and angle physical contact (APC) connectors. This invention pertains to optical splicer joints and splice-on pre-made optical connectors.

BACKGROUND OF THE INVENTION

In the fiber optics communication industry, many companies have developed means by which optical fibers can be connected to one another. Splicers, in particular, come in two primary forms: fusion splicers and mechanical splicers. A fusion splicer physically fuses the ends of two optical fibers together by the application of heat, typically from an electrical arc. Fusion splicers are advantageous in that they create splices in which the insertion and return losses are precisely controlled. However, fusion splicing is complicated, expensive, and requires advanced technical equipment not readily suited for use in the field, particularly if local electric power required is not available.

A mechanical splicer is a junction of two fibers aligned with one another and held in place within a ferrule or similar assembly, such as a traditional v-groove alignment ferrule. The fibers are not physically joined as in a fusion splice. Rather, the fiber ends are held very close together within the ferrule with an optical index matching gel in between so that light can pass from one end to the other end with least amount of disturbance. Because of its ease in application and simplicity in terms of labor, training and equipment cost, mechanical splicing is preferred for use in the field, especially when electrical power is hard to reach, and the terminations and splicing points are scattered around, not centralized, such as for installation in multi-dwelling-units.

In the past, the prior art has used v-groove alignment for most of the mechanical connectors as well as for mechanical splice-on connectors. In these configurations, the fibers to be connected are laid in the v-groove such that the fiber tip of one fiber abuts the tip of the second fiber. The fibers are aligned in the v-groove, and they are then locked in the groove by a hard pad or cover (the hardness is usually softer than the glass material itself) pressing into the v-groove. The hard pad and the v-groove form a triangle for securing the fibers.

However, this v-groove alignment may not be the best in the case of connecting two fibers. The v-groove is the same from the left to right with respect to the mechanical joint. One or both fibers to be mechanically connected will typically have a slightly varying diameter due to manufacturing variations. For example, a fiber out-diameter of the stripped end is typically specified to have a diameter of 125 µm, but in reality there is always some plus-minus variation. If two fibers are inserted from opposite ends of a v-groove, the variation in diameter will create an offset for the core (the center axis of about 8-9 µm in diameter) of the fibers. To be more specific, the axis of one fiber will be shifted with respect to the axis of the other fiber. The offset is part of the eccentricity. The eccentricity remains even after the fibers are locked in the v-groove. This tiny eccentricity, which may be only a few microns, will impact the insertion loss as well as the return loss of the junction between the two fibers. In addition, v-groove configured joints often do not apply an evenly-distributed force on the portions of the fibers contained within the groove. This can lead to misalignment of the fiber tips within the joint and can cause additional insertion and return losses. It would be desirable to provide a configuration in the joints that minimizes such an unperfected physical alignment and unwanted extra-manually caused losses.

SUMMARY OF THE INVENTION

The inventors have discovered that the problems associated with the prior art can be overcome through the use of new radially symmetric locking mechanical splicers for both flat and angle cleaved fiber termination and similarly for mechanical splice-on connectors with UPC and APC end-faces.

In one embodiment, the invention provides a splicer joint locking assembly for mechanically splicing together two optical fibers. The terms "optical fiber" and "fiber" are used herein to describe an optical fiber cable unit having has a coated portion (about 250-900 µm in diameter) and a stripped end (about 125 µm in diameter) having no coating (i.e. the bare fiber) terminating at a clean cleaved optical fiber tip.

The splicer joint of the invention is manufactured from a pre-formed slightly deformable plastic material (with limited stretching and compression ratio with respect to its diameter). The splicer joint comprises: a first end; a second end; and an exterior surface between the first and second ends. The exterior surface is cylindrical (circular cross-section) and has at least one raised ridge extending circumferentially around the exterior surface. The splicer joint contains an axial bore extending from the first end to the second end. The axial bore has a middle portion between the first and second ends. In the middle portion, the diameter of the axial bore of the splicer joint is slightly less than the diameter of the stripped end of each fiber. In a preferred embodiment, the diameter of the axial bore in the middle portion is about 5-10 µm less than the diameter of the stripped end. Because the joint is made of a slightly deformable plastic material, the axial bore will expand slightly upon receiving the stripped end of the fiber. This is due to the process of axially inserting the fiber causing the radially symmetric hole to expand. Although the bore expands, it still frictionally receives the stripped end of the fiber.

The splicer joint receives the first fiber in the axial bore from the first end and the second fiber in the axial bore from the second end. As the fibers are pushed into the joint from opposite ends, the stripped end of each fiber is frictionally received within the middle portion of the axial bore to a specified distance. The middle portion expands so that it frictionally receives the stripped end (with its diameter of 125 µm) of each fiber. The fiber tip of the first fiber is aligned with and abuts the fiber tip of the second fiber in the middle portion. In a preferred embodiment, the axial bore of the splicer joint has a tapered section at the first and second ends for guiding the first and second fibers into the axial bore, respectively.

A locking case is provided for receiving the splicer joint and thereafter crimping the splicer joint. The locking case comprises a first section, a second section, and a locking mechanism for locking the first section to the second section.

The first and second sections have etched portions. When the first section is locked to the second section, the etched portions form an internal surface that is complementary in shape to the exterior surface of the splicer joint, with the exception that the internal surface of the locking case at least in the area corresponding to the raised ridge has a negative tolerance, i.e., a dimension that is slightly less than the dimension of the raised ridge.

When the splicer joint is placed in the locking case and the first section is locked to the second section, the internal surface exerts an inward radially symmetric force on at least the raised ridge on the exterior surface. The force causes the raised ridge on the splicer joint to crimp and lock the first and second fibers within the splicer joint.

In another embodiment, the invention utilizes a splicer joint having a plurality of raised ridges and a locking case with a complementary shape. In particular, the splicer joint is made from a slightly deformable plastic material and has a left end, a right end, and an exterior cylindrical surface extending from the left end to the right end. The splicer joint also has a plurality of raised ridges extending circumferentially around the cylindrical exterior surface. An axial bore extends from the left end to the right end, and has a middle portion between the left and right ends with a diameter that is slightly less than the diameter of the stripped end of each fiber. The axial bore in the middle portion is preferably about 5-10 µm less than the diameter of the stripped end. The axial bore of the splicer joint preferably has a tapered section at the left and right ends for guiding the first and second fibers into the axial bore, respectively.

The splicer joint receives the first fiber in the axial bore from the left end and the second fiber in the axial bore from the right end such that the stripped end of each fiber is frictionally received within the middle portion of the axial bore and the fiber tip of the first fiber is aligned with and abuts the fiber tip of the second fiber in the middle portion. In this embodiment, the locking case for receiving the splicer joint comprises: a base; a lid that closes over the base; and a locking mechanism for locking the lid to the base. The base and lid have interior etched portions. When the lid is closed over and locked to the base, the interior etched portions form a cylindrical surface with circumferential grooves. The interior surface of the locking case is complementary to the cylindrical exterior surface on the splicer joint, with the exception that the dimension of each circumferential groove is slightly less than the dimension of the corresponding ridge on the splicer joint.

When the splicer joint containing the first and second fibers is placed in the locking case and the lid is closed over and locked to the base, the circumferential grooves exert an inward radially symmetric force on the ridges of the splicer joint, thereby causing the ridges to deform. The ridges consequently exert a force on the first and second fibers within the axial bore, and locking the first and second fibers within the splicer joint.

In this embodiment, the axial bore preferably further comprises: a left portion between the left end and the middle portion; and a right portion between the right end and the middle portion. The diameter of the axial bore in the left and right portions is slightly greater (preferably about 20 µm) than the diameter of the coated portion of the fibers so that the left portion is capable of receiving a coated portion of the first fiber, and the right portion is capable of receiving a coated portion of the second fiber. In addition, in this embodiment, the raised ridges comprise a left, middle and right ridges extending circumferentially around the cylindrical exterior over the left, middle and right portions of the axial bore, respectively.

When the splicer joint carrying first and second fibers is placed in the locking case and the lid is closed over and locked to the base, the left, middle, and right ridges deform and exert a force on the coated portion of the first fiber, the stripped ends of the first and second fibers, and on the coated portion of the second fiber, respectively.

In yet another embodiment, the splicer joint locking assembly has an external cylindrical surface with a variable diameter. The diameter may vary in many ways. In a preferred embodiment, the splicer joint comprises: a left end, a right end and a mid-point between the left and right ends. The splicer joint, made of a slightly deformable plastic material, has a variable diameter cylindrical exterior surface with equal cylindrical diameters at the left and right ends, and a maximum cylindrical diameter at the mid-point. In other words, the splicer joint has a reverse double conical cylindrical exterior shape. The exterior surface further has a raised ridge extending circumferentially around the cylindrical exterior surface at the mid-point. In this embodiment, the splicer joint has an axial bore extending from the left end to the right end. The axial bore has a middle portion running through the area of the mid-point. The axial bore in the middle portion has a diameter that is slightly less (5-10 µm) than the diameter of the stripped portion of the fibers. The splicer joint exterior is further defined by a left portion between the left end up to the mid-point, and a right portion between the right end up to and including the mid-point.

The splicer joint receives the first fiber in the axial bore from the left end and the second fiber in the axial bore from the right end. The stripped end of each fiber is frictionally received within the middle portion of the axial bore (which expands to receive the stripped end). The fiber tip of the first fiber is aligned with and abuts the fiber tip of the second fiber in the middle portion. In this embodiment, the locking case for receiving the splicer joint comprises: a left section; a right section; and a snap-fit locking mechanism for locking the left section to the right section when the sections are pushed toward one another. The locking mechanism includes a circular lip extending around a peripheral portion on one end of the left section and a lip-receiving circular groove on one end of the right section.

The left section of the locking case has an internal bore for receiving the first fiber. The bore includes a tapered bore section forming a surface that is complementary to the exterior of the left portion of the splicer joint. The right section similarly has an internal bore for receiving the second fiber. The bore in the right section includes a tapered internal bore section and a circumferential internal groove forming a surface that is complementary to the right portion of the splicer joint. When the left and right sections of the locking case are locked together, the internal bores of the section form an internal surface that is complementary to the exterior surface of the splicer joint. However, the internal surface of the locking case at least in the area of the circumferential internal groove corresponding to the raised ridge has a dimension that is slightly less than the dimension of the raised ridge. When a splicer joint carrying the first and second fibers is placed in the locking case and the left section is pushed toward and locked to the right section, the circumferential internal groove of the right section exerts a force on the raised ridge. The force locks the first and second fibers within the splicer joint.

The tapered bores of the left and right sections of the locking case may optionally have dimensions that are less than the dimensions of the corresponding areas of the left and right portions of the exterior of the splicer joint. With such structure, when the splicer joint is placed in the locking case and the left section is pushed toward and locked to the right section, the tapered internal bore of the left section exerts a force on the left portion of the splicer joint, and the tapered internal bore of the right section exerts a force on the right portion and on the ridge, respectively.

The axial bore may further comprise a first bore portion between the first end and the middle portion, and a second bore portion between the second end and the middle portion. The diameter of the axial bore in the first and second bore portions is slightly greater than the diameter of the coated portion of each fiber. With this structure, the first bore portion receives the coated portion of the first fiber and the second bore portion receives the coated portion of the second fiber. The axial bore of the splicer joint may also have a tapered section at the left and right ends for guiding the first and second fibers into the axial bore, respectively.

The invention also provides a method of mechanically splicing together first and second optical fibers, each fiber having a coated portion and a stripped end with no coating terminating at a fiber tip. The method uses one of the assemblies described above. The method comprises the steps of: (a) inserting the first fiber into the axial bore of the splicer joint from the first end and inserting the second fiber into the axial bore from the second end such that the stripped end of each fiber is frictionally received within the middle portion of the axial bore, and the fiber tip of the first fiber is aligned with and abuts the fiber tip of the second fiber in the middle portion; (b) placing the splicer joint within the locking case; and (c) closing the locking case and locking the first section to the second section. In the case where the method uses the locking case with the snap-fit locking mechanism, the step of closing the case requires pushing the left section and right section of the locking case toward one another to engage the snap-fit locking mechanism and lock the sections to one another.

The invention also provides a snap-fit assembly for mechanically locking a field fiber within a mechanical splice-on connector, such as an angle-cleaved mechanical splice-on APC connector, or a flat-cleaved mechanical splice-on UPC connector. The assembly comprises: a connector housing having a first end with an opening, and a second end. The second end includes a cylindrical bore extending up to the first end. The cylindrical bore further includes an internally oriented circumferential groove.

A ferrule/base subunit is disposed in the opening of the first end. The subunit contains a fiber stub extending from the subunit into the cylindrical bore of the housing. A locking ferrule formed from a slightly deformable plastic is disposed within the cylindrical bore. The locking ferrule has a first end attached to the fiber stub ferrule subunit, and a second end disposed within the second open end of the housing. The locking ferrule contains a first axial bore, which has a diameter slightly less than the diameter of the fiber stub and of the stripped end of the field fiber. A portion of the first axial bore frictionally receives the fiber stub extending from the fiber stub ferrule subunit. The remaining portion of the axial bore will frictionally receive the stripped end of the field fiber. The locking ferrule also has a second axial bore coaxial with the first axial bore. The second axial bore has a diameter slightly greater than the coated portion of the field fiber which may have a diameter of e.g. 900 µm. The second axial bore will receive the coated portion of the field fiber. Finally, the locking ferrule has a tapered cylindrical exterior surface with a maximum outer diameter which is less than the diameter of the cylindrical bore of the housing. The difference in diameters results in an annular gap between the cylindrical bore of the housing and the exterior surface of the locking ferrule.

The assembly also includes a cylindrical cone-shaped locking boot having an internal axial bore for receiving a field fiber and for engaging the locking ferrule. The locking boot includes a first boot end having a diameter and wall thickness that permit the locking boot to be inserted into the annular gap. The locking boot has a variable diameter and variable wall thickness along the longitude of the locking boot. As the boot is pushed into the annular gap, the variable diameter and variable wall thickness cause the boot to exert an inward radially symmetric force on the locking ferrule. The boot also includes a raised ridge extending circumferentially around the exterior. The raised ridge snap-fit locks within the internally oriented circumferential groove in the cylindrical bore of the housing when the boot is pushed a certain distance into the annular gap.

When the locking boot is pushed into the annular gap, the walls of the boot exert an inward radially symmetric force on the locking ferrule. The force deforms the locking ferrule and exerts a force on the field fiber contained within the locking ferrule to lock the field fiber within the locking ferrule.

BRIEF DESCRIPTION OF THE DRAWINGS

This specification makes reference to the following figures wherein like reference numerals designate like parts in the figures.

DETAILED DESCRIPTION OF THE INVENTION

Figure 1:
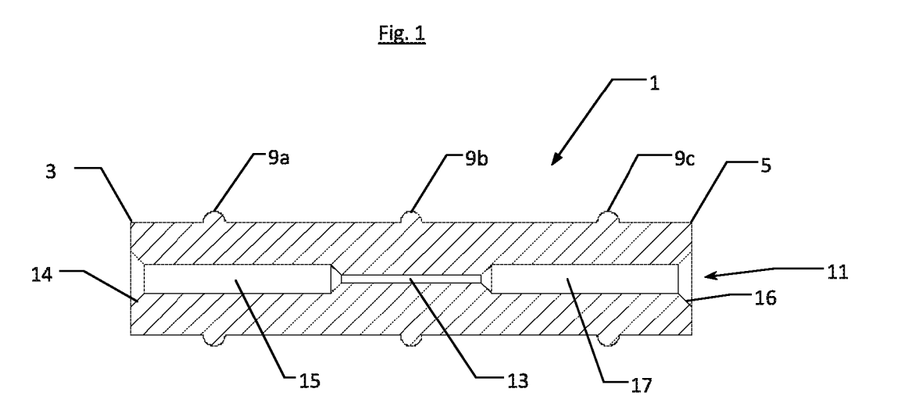
FIG. 1 is a cross-sectional view of a splicer joint according to a first embodiment of the invention.
Figure 2:
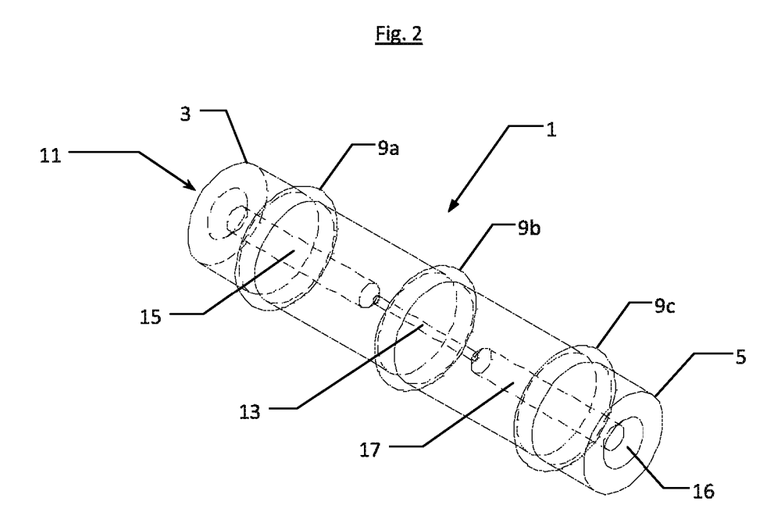
FIG. 2 is an isometric view of the splicer joint shown in FIG. 1.
Figure 3:
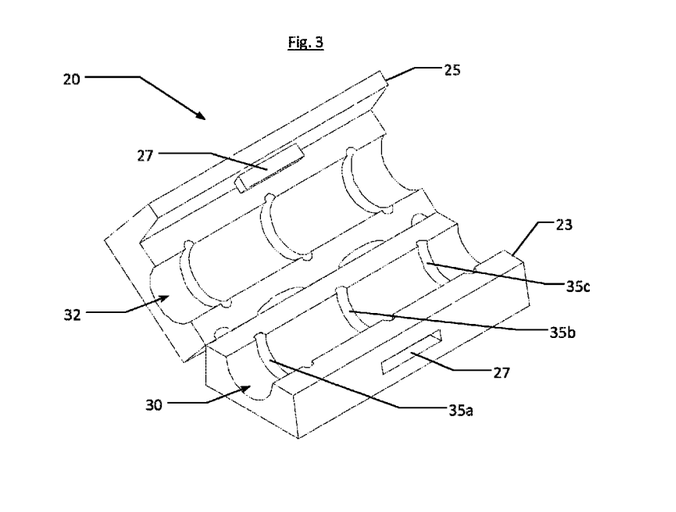
FIG. 3 is an isometric view of the locking assembly according to the first embodiment of the invention.

FIGS. 1-3 show a first embodiment of a splicer joint locking assembly for mechanically splicing together first and second optical fibers (not shown). Each fiber to be locked in the joint has a coated portion (such as a 900 µm coating), and a stripped end with no coating (such as a bare fiber which is 125 µm in diameter) terminating at a fiber tip.

FIG. 1 shows a cross-sectional view of the splicer joint. FIG. 2 shows an isometric view of the splicer joint. The splicer joint 1 is made from a slightly deformable plastic material and has a left end 3 and a right end 5. The exterior of the splicer joint is cylindrical in shape extending from the left end 3 to the right end 5. (See FIG. 2.)

An axial bore 11 extends from the left end 3 to the right end 5. The axial bore 11 has a middle portion 13 between the left end 3 and right end 5. The diameter of the axial bore in the middle portion 13 is slightly less than the diameter of the stripped ends of the fibers. The axial bore in the middle portion 13 is expandable and will expand slightly when the stripped end of a fiber is pushed into the bore. Preferably, the diameter of the axial bore in the middle portion 13 is about 5-10 μm less than the diameter of the stripped end, which is typically about 125 μm in diameter. The axial bore also preferably comprises a left portion 15 between the left end 3 and the middle portion 13, and a right portion 17 between the right end 5 and middle portion 13. The diameter of the axial bore in the left and right portions 15 and 17 is slightly greater, preferably about 20 μm greater, than the diameter of the coated portion (typically 250-900 μm) of the fibers. The axial bore 11 of the splicer joint preferably has a tapered section 14 at the left end 3 and a tapered section 16 at the right end 5. The tapered sections 14 and 16 serve as a guide for guiding the first and second fibers into the axial bore.

The exterior of the splicer joint 1 has a plurality of raised ridges 9a, 9b and 9c extending circumferentially around the cylindrical exterior surface. The raised ridges comprise a left ridge 9a, a middle ridge 9b, and a right ridge 9c extending circumferentially around the cylindrical exterior in the area of left portion 15, middle portion 13, and right portion 17 of the axial bore, respectively.

The splicer joint 1 receives the first fiber in the axial bore 11 from the left end 3 and the second fiber in the axial bore 11 from the right end 5. The stripped end of each fiber is frictionally received within the middle portion 13 of the axial bore 11 (as that bore expands slightly) and the fiber tip of the first fiber is aligned with and abuts the fiber tip of the second fiber in the middle portion 13. A conventional index matching gel may be inserted into the middle portion 13 to provide for better light transmission between the two fiber tips. The left portion 15 of the axial bore 11 receives a coated portion of the first fiber. Similarly, the right portion 17 of the axial bore 11 receives a coated portion of the second fiber.

FIG. 3 shows a locking case 20 for receiving the splicer joint described in FIGS. 1 and 2. Locking case 20 comprises: a base 23; a lid 25 that closes over the base; and a locking mechanism 27 for locking the lid 25 to the base 23. The base 23 and lid 25 have interior etched portions 30 and 32, respectively. When the lid 25 is closed over and locked to the base 23, the interior etched portions 30 and 32 form a cylindrical surface with circumferential grooves 35a, 35b and 35c. This grooved cylindrical surface is complementary to the cylindrical exterior surface on the splicer joint 1, with the exception that a dimension (such as the diameter) of each circumferential groove 35a, 35b and 35c is slightly less than the dimension of the corresponding ridge 9a, 9b and 9c, respectively, on the splicer joint 1.

When the splicer joint 1 containing the first and second fibers is placed in the locking case 20 and the lid 25 is closed over and locked to the base 23, the circumferential grooves 35a, 35b and 35c exert an inward radially symmetric force on left, middle and right ridges 9a, 9b and 9c, respectively, of the splicer joint, thereby causing the ridges to deform. The ridges 9a, 9b and 9c consequently exert a force on the first and second fibers within the left, middle and right portions of the axial bore, respectively. This force locks the first and second fibers at the same time within the splicer joint 1. The surface tension that the middle portion 13 of the axial bore provides against the stripped ends of the fibers, and the radially symmetric nature of the clamping force by the splicer joint and locking assembly, cause the first and second fibers to be locked in the joint without altering the alignment of the fiber tips in the middle portion 13 of the axial bore. This action minimizes insertion and return losses that would otherwise occur. The locking case 20 may be removed from the splicer joint 11 or left locked on the splicer joint 1.

In operating the assembly, the first fiber is inserted into the axial bore 11 of the splicer joint 1 from the left end 3 and the second fiber is inserted into the axial bore 11 from the right end 5 until the stripped end of each fiber is frictionally received within the middle portion 13 of the axial bore 11, and the fiber tip of the first fiber is aligned with and abuts the fiber tip of the second fiber in the middle portion 13. An index matching gel (not shown) may also be inserted into the middle portion 13 to promote better transmission between the fiber tips of the first and second fibers.

The splicer joint is then placed within the locking case 20, by laying the splicer joint 1 within the etched portion 30 in the base 23 such that a portion of ridges 9a, 9b and 9c fall into grooves 35a, 35b and 35c, respectively, in the base 23. Thereafter, the lid 25 is closed over the base 23 and the locking mechanism 27 is engaged to lock the lid 25 to the base 23. As mentioned above, when the lid 25 is locked to the base 23, the circumferential grooves 35a, 35b and 35c exert a force on the corresponding ridges 9a, 9b and 9c. This force causes the ridges 9a, 9b and 9c to deform and consequently exert a force on the first and second fibers, locking the fibers within the splicer joint 1. The forces exerted are radially symmetric due to the circular nature of the construction. The radially symmetric forces lock the fibers together without altering the alignment between the fiber tips of the first and second fibers in the middle portion 13. This preserved alignment minimizes insertion and return losses during transmission.

Figure 4:
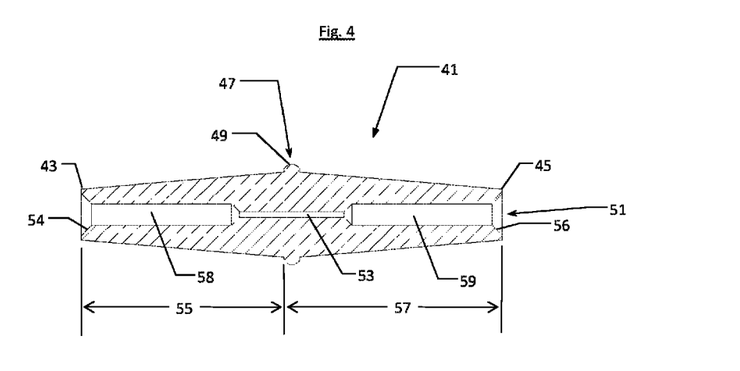
FIG. 4 is a cross-sectional view of a splicer joint according to a second embodiment of the invention.
Figure 5:
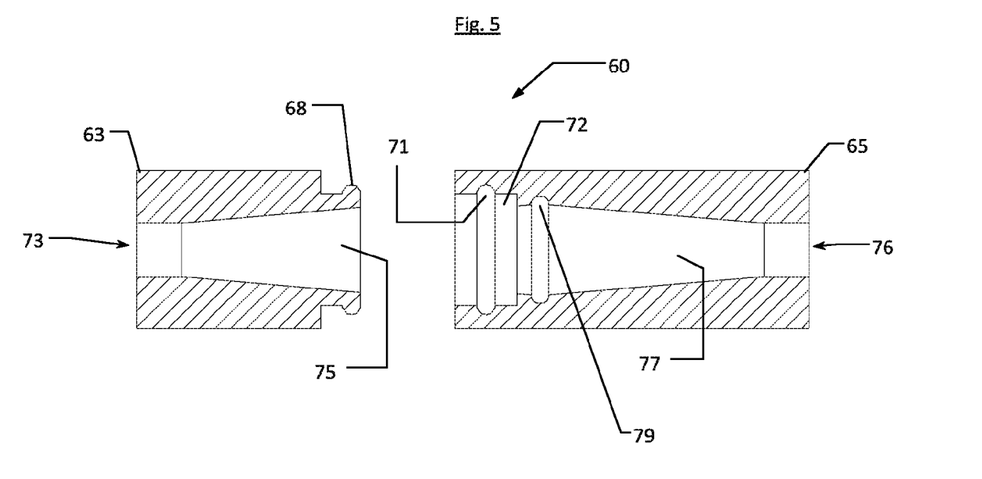
FIG. 5 is an cross sectional view of a locking assembly according to the second embodiment of the invention.

FIGS. 4 and 5 show another embodiment of the invention. Referring to FIG. 4, the splicer joint 41 comprises: a left end 43, a right end 45, and a mid-point 47 between the left end 43 and right end 45. The splicer joint 41 is made of a slightly deformable plastic material and has a variable diameter cylindrical exterior surface with equal cylindrical diameters at the left and right ends 43 and 45, and a maximum cylindrical diameter at the mid-point 47. The exterior surface has a raised ridge 49 extending circumferentially around the cylindrical exterior surface at the mid-point 47. The exterior of the splicer joint 41 is further defined by a left portion 55 between the left end 43 up to about the mid-point 47 and a right portion 57 between the right end 45 up to and including the mid-point 47.

The splicer joint 41 has an axial bore 51 extending from the left end 43 to the right end 45. The axial bore 51 has a middle portion 53 running through the area of the mid-point 47. The axial bore 51 in the middle portion 53 has a diameter that is slightly less (about 5-10 μm) than the diameter of the stripped end, which is typically about 125 μm. The axial bore 51 in the middle portion 53 is expandable and will expand slightly when a stripped end of each fiber is pushed into the bore. The axial bore 51 includes a left bore portion 58 between the left end 43 and the middle portion 53, and a right bore portion 59 between the right end 45 and the middle portion 53. The diameter of the axial bore in the left and right bore portions 58 and 59 is slightly greater than the diameter of the coated portion on the optical fiber, for example, 900 μm for the coated portion of the fiber. The axial bore of the splicer joint may also have tapered sections 54 and 56 at the left and right ends 43 and 45, respectively, for guiding the first and second fibers into the axial bore, respectively.

FIG. 5 shows a locking case 60 for receiving the splicer joint 41. The locking case 60 comprises: a left section 63; a right section 65; and a snap-fit locking mechanism for locking the left section 63 to the right section 65 when the sections are pushed toward one another. The snap-fit locking mechanism includes a circular lip 68 extending around a peripheral portion on one end of the left section 63 and a lip-receiving circular groove 71 on one end of the right section 65. When the ends of the left section 63 and right section 65 are pushed toward one another, the circular lip 68 snap-fits into the circular lip-receiving groove 71 and locks the left section 63 to the right section 65. A small annular gap 72 is provided in the right section 65 to provide a tolerance that allows the snap-fit locking assembly to work smoothly given that the dimensions of the parts may not be exact.

The left section 63 of the locking case has an internal bore 73 for receiving the first fiber. The internal bore 73 includes a tapered bore section 75 forming a surface that is complementary to the exterior of the left portion 55 of the splicer joint 41. The right section 65 similarly has an internal bore 76 for receiving the second fiber. The internal bore 76 in the right section includes a tapered internal bore section 77 and a circumferential internal groove 79 forming a surface that is complementary to the right portion 57 (which includes the raised ridge 49) of the splicer joint 41. When the left section 63 and right section 65 are locked together, the tapered internal bore sections 75 and 77 form an internal surface that is complementary to the exterior surface of the splicer joint. However, the internal surface of the locking case 60 at least in the area of the circumferential internal groove 79 corresponding to the raised ridge 49 has a dimension (such as the diameter) that is slightly less than the dimension of the raised ridge 49.

When the left section 63 is pushed toward and locked to the right section 65 over a splicer joint 41 carrying first and second fibers, the circumferential internal groove 79 of the right section 65 exerts a force on the raised ridge 49 of the splicer joint 41. The force causes the splicer joint 41 to deform and locks the first and second fibers within the splicer joint. This locking force, combined with the surface tension on the stripped ends of the fibers by the middle portion 53 of the splicer joint, minimizes any misalignment between the fiber tips and consequently reduces insertion and return losses during optical transmissions.

The tapered bore section 75 of the left section 63 may optionally have a dimension (such as the diameter) that is less than the corresponding dimension on the left portion 55 of the splicer joint. Similarly, the tapered bore section 77 of the right section 65 may optionally have a dimension (such as the diameter) that is less than the corresponding dimension on the right portion 57 of the splicer joint. With such a structure, when the splicer joint 41 carrying first and second fibers is placed in the locking case and the left section 63 is pushed toward and locked to the right section 65, the tapered internal bore 75 exerts a force on the left portion 55 of the splicer joint 41, and the tapered internal bore 77 exerts a force on the right portion 57 (in addition to exerting a force on the ridge 49). The additional forces exerted by the tapered bores 75 and 77 cause the splicer joint to deform slightly and exert a force on additional portions of the fibers at the same time in the splicer joint 41.

The embodiment shown in FIGS. 4 and 5 is used as follows. The user first threads the first fiber through the internal bore 73 (and tapered bore section 75) in the left section 63 of the locking case 60. The first fiber is then inserted into the axial bore 51 of the splicer joint 41 from the left end 43 such that the coated portion of the fiber is received in the left portion 58 of the axial bore 51 and the stripped end is frictionally received within the middle portion 53, which expands to received the stripped end. The same process is carried out for the second fiber but using right section 65 of the locking assembly and the right side 45 of the splicer joint 41. Once finished, the stripped end of each fiber is frictionally received within the middle portion 53 of the axial bore from opposite sides and the fiber tip of the first fiber is aligned with and abuts the fiber tip of the second fiber in the middle portion 53. An index matching gel inserted into the middle portion 43 will help improve the insertion loss and return loss of the mechanical splice.

Thereafter, the left section 63 and right section 65 of the locking case 60 are pushed toward one another to engage the snap-fit locking mechanism and lock the sections to one another. As described above, the locking of sections 63 and 65 causes the internal tapered bore sections 75 and 77 to exert a force on the splicer joint 41 at least at the point of the raised ridge 49. The exerted force(s) lock the first and second fibers within the splicer joint.

Figure 6:
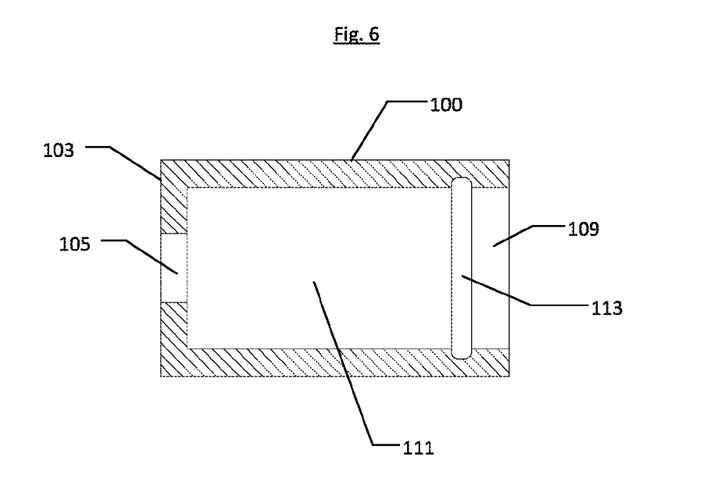
FIG. 6 is a cross-sectional view of a housing according to a third embodiment of the invention.

FIGS. 6-11 show an additional embodiment of the invention. This embodiment provides a radially symmetric snap-fit assembly for mechanically locking a field optical fiber within a radially symmetric ferrule of a splice-on connector (such as UPC or APC). The field fiber has a coated portion and a stripped end terminating at a tip. As shown in FIG. 6, the assembly comprises a connector housing 100 having a first end 103 with an opening 105 and a second open end 109. The second open end 109 includes a cylindrical bore 111 extending up to first end 103. The cylindrical bore 111 further includes an internally oriented circumferential groove 113.

Figure 7:
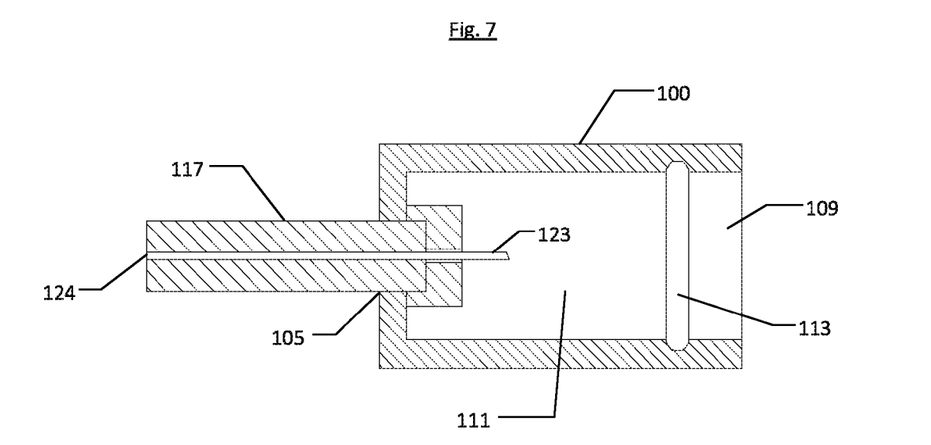
FIG. 7 is a cross-sectional view of the housing and ferrule/base subunit according to the third embodiment of the invention.
Figure 8:
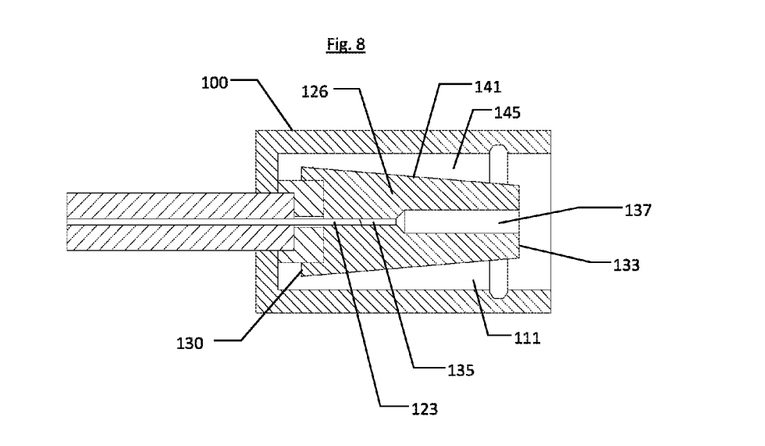
FIG. 8 is a cross-sectional view of the housing, ferrule/base subunit, and locking ferrule according to the third embodiment of the invention.

Referring to FIG. 7, a ferrule/base subunit 117 is disposed in the opening 105 on the housing 100. The subunit 117 contains a cleaved fiber stub 123 (such as an angle-cleaved stub for APC connectors or a flat cleaved fiber stub for UPC connectors) extending from the subunit into the cylindrical bore 111 of the housing. The fiber stub 123 also extends to the outer end 124 of the subunit 117 where it is cut and polished in the factory. Now referring to FIG. 8, a locking ferrule 126 formed from a slightly deformable plastic is disposed within the cylindrical bore 111 of the housing 100. The locking ferrule has a first end 130 attached to the subunit 117, and a second end 133 disposed within the second open end of the housing. The locking ferrule 126 contains a first axial bore 135 which has a diameter slightly less than the diameter of the fiber stub 123 and of the stripped end of the field optical fiber (not shown). A portion of the first axial bore 135 expands slightly and frictionally receives the fiber stub 123 extending from the subunit 117. The remaining portion of the axial bore 135 will also expand slightly for frictionally receiving the stripped end of the field fiber (not shown). The locking ferrule 126 also has a second axial bore 137 coaxial with the first axial bore. The second axial bore 137 has a diameter slightly greater than the coated portion of the field fiber. The second axial bore 137 is for receiving the coated portion of the field fiber (not shown). Finally, the locking ferrule has a tapered cylindrical exterior surface 141 with a maximum outer diameter which is less than the diameter of the cylindrical bore 111 of the housing. The difference in diameters results in an annular gap 145 between the cylindrical bore 111 of the housing 100 and the exterior surface of the locking ferrule 126.

Figure 9:
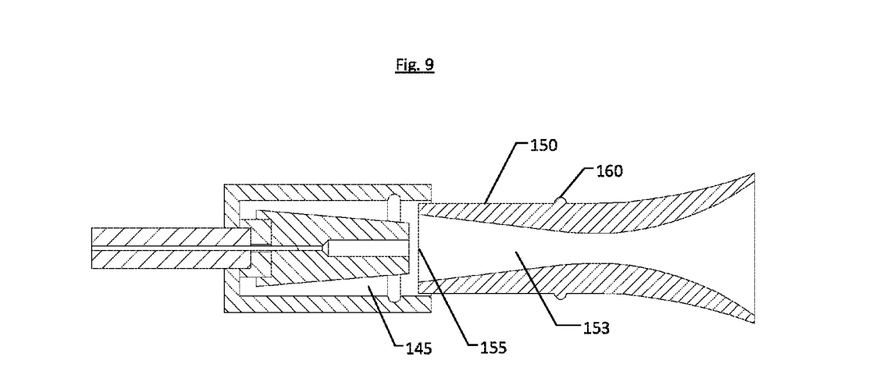
FIG. 9 is a cross-sectional view of the housing, ferrule/base subunit, locking ferrule, and locking boot prior to engagement in the annular groove between the housing and the locking ferrule according to the third embodiment of the invention.
Figure 10:
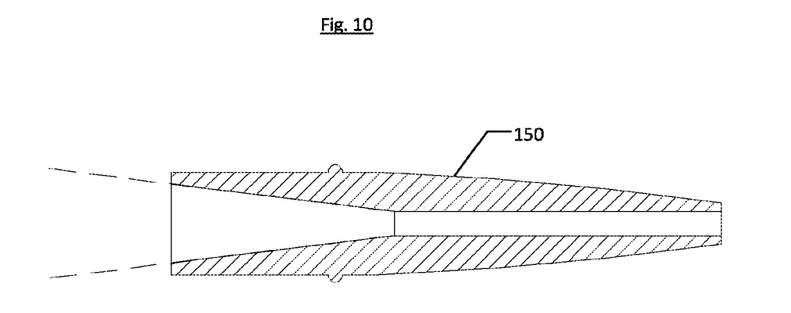
FIG. 10 is a cross-sectional view of an alternate locking boot according to the third embodiment of the invention.

Referring to FIG. 9, the assembly also includes a cylindrical cone shaped locking boot 150 having an internal axial bore 153 for receiving the field fiber and for engaging the locking ferrule 126. The locking boot 150 includes a first boot end 155 having a diameter and wall thickness that permit the first boot end 155 to be inserted into the annular gap 145. The locking boot 150 has a variable diameter and variable wall thickness along the longitude of the locking boot. The interior wall of the locking boot 150 also has a slight v-cone shape wherein the wall thickness of the locking boot 150 is greater than the thickness of the annular gap 150. FIG. 10 shows an alternate construction for the locking boot 150 in which the v-cone shape is emphasized in dotted lines.

Figure 11:
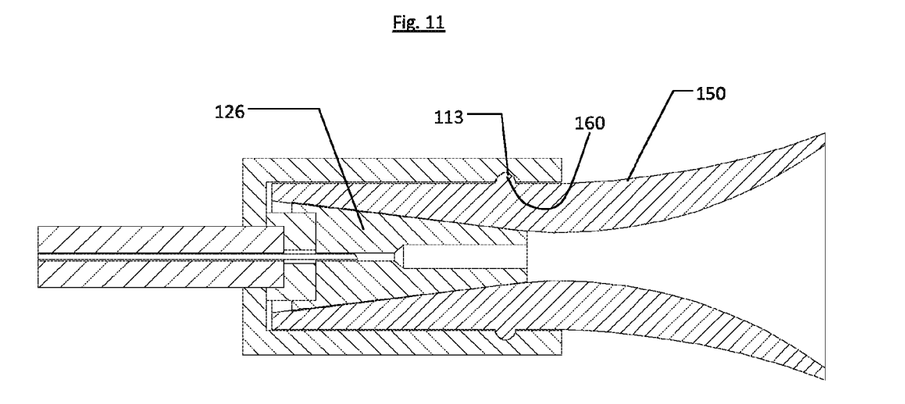
FIG. 11 is a cross-sectional view of the housing, ferrule/base subunit, locking ferrule, and locking boot engaged in the annular groove between the housing and the locking ferrule according to the third embodiment of the invention.

Referring to FIG. 11, as the locking boot 150 is pushed into the annular gap 145, the variable diameter and variable wall thickness of the locking boot 150 cause the locking boot 150 to exert an inward radially symmetric force on the locking ferrule 126. The force deforms the locking ferrule 126 and exerts a force on the field fiber contained within the locking ferrule 126 to lock the field fiber within the locking ferrule 126. The locking boot 150 also includes a raised ridge 160 extending circumferentially around the exterior. The raised ridge 160 snap-fit locks within the internally oriented circumferential groove 113 in the cylindrical bore 111 of the housing 100 when the locking boot 150 is pushed a certain amount into the annular gap 145. This action locks the locking boot 150 to the housing 100. The radially symmetric force of the locking boot 150 on the locking ferrule 126, and the surface tension that the axial bore 135 provides on both the fiber stub 123 and on the stripped end of the optical fiber provide for an excellent alignment of the fiber stub and field fiber, which alignment minimizes insertion and return losses.

In addition to the embodiments of the present invention described above, those skilled in the art will be able to arrive at a variety of other arrangements and steps which, if not explicitly described in this document, nevertheless embody the principles of the invention and fall within the scope of the appended claims.

What is claimed is:

1. A splicer joint locking assembly for mechanically splicing together first and second optical fibers, each fiber having a coated portion and a stripped end with no coating terminating at a fiber tip, the assembly comprising:
   (i) a splicer joint made from a slightly deformable plastic material, the splicer joint comprising:
      a first end;
      a second end; and
      a cylindrical exterior surface between the first and second ends, the exterior surface having at least one raised ridge extending circumferentially around the exterior surface; and
      an axial bore extending from the first end to the second end, the axial bore having a middle portion, the axial bore in the middle portion having a diameter that is slightly less than the diameter of the stripped end of each fiber;
      the splicer joint for receiving the first fiber in the axial bore from the first end and the second fiber in the axial bore from the second end such that the stripped end of each fiber is frictionally received within the middle portion of the axial bore and the fiber tip of the first fiber is aligned with and abuts the fiber tip of the second fiber in the middle portion; and
   (ii) a locking case for receiving the splicer joint, the locking case comprising:
      a first section;
      a second section; and
      a locking mechanism for locking the first section to the second section;
      the first and second sections having etched portions, the etched portions forming, when the first section is locked to the second section, an internal surface that is complementary to the exterior surface of the splicer joint, with the exception that the internal surface at least in the area corresponding to the raised ridge has a dimension that is slightly less than the dimension of the raised ridge;
   wherein, when the splicer joint is placed in the locking case and the first section is locked to the second section, the internal surface exerts an inward radially symmetric force on at least the raised ridge on the exterior surface, which force locks the first and second fibers within the splicer joint.

2. The assembly of claim 1, wherein the axial bore in the middle portion is about 5-10 µm less than the diameter of the stripped end of each fiber.

3. The assembly of claim 2, wherein the stripped end of each fiber has a diameter of about 125 µm.

4. The assembly of claim 3, wherein the axial bore of the splicer joint has a tapered section at the first and second ends for guiding the first and second fibers into the axial bore, respectively.

5. A splicer joint locking assembly for mechanically splicing together first and second optical fibers, each fiber having a coated portion and a stripped end with no coating terminating at a fiber tip, the assembly comprising:
   (i) a splicer joint made from a slightly deformable plastic material, the splicer joint having:
      a left end;
      a right end;
      a cylindrical exterior surface extending from the left end to the right end and having a plurality of raised ridges extending circumferentially around the cylindrical exterior surface; and
      an axial bore extending from the left end to the right end, the axial bore having a middle portion between the left and right ends, the axial bore in the middle portion having a diameter that is slightly less than the diameter of the stripped end of each fiber;
      the splicer joint for receiving the first fiber in the axial bore from the left end and the second fiber in the axial bore from the right end such that the stripped end of each fiber is frictionally received within the middle portion of the axial bore and the fiber tip of the first fiber is aligned with and abuts the fiber tip of the second fiber in the middle portion; and
   (ii) a locking case for receiving the splicer joint, the locking case comprising:
      a base;
      a lid that closes over the base; and
      a locking mechanism for locking the lid to the base;
      the base and lid having interior etched portions, the etched portions forming, when the lid is closed over and locked to the base, a cylindrical surface with circumferential grooves, said surface being complementary to the cylindrical exterior surface on the splicer joint with the exception that a dimension of each circumferential groove is slightly less than the dimension of the corresponding ridge on the splicer joint;
   wherein, when the splicer joint containing the first and second fibers is placed in the locking case and the lid is closed over and locked to the base, the circumferential grooves exert an inward radially symmetric force on the ridges of the splicer joint causing the ridges to deform and exert a force on the first and second fibers within the axial bore, which force locks the first and second fibers within the splicer joint.

6. The assembly of claim 5, wherein the axial bore further comprises:
a left portion between the left end and the middle portion; and
a right portion between the right end and the middle portion,
wherein the diameter of the axial bore in the left and right portions is slightly greater than the diameter of the coated portion of each fiber;
the left portion for receiving a coated portion of the first fiber, the right portion for receiving a coated portion of the second fiber.

7. The assembly of claim 6, wherein the raised ridges comprise a left, middle and right ridges extending circumferentially around the cylindrical exterior over the left, middle and right portions of the axial bore, respectively; and
wherein, when the splicer joint is placed in the locking case and the lid is closed over and locked to the base, the left, middle, and right ridges deform and exert a force on the coated portion of the first fiber, the stripped ends of the first and second fibers, and the coated portion of the second fiber, respectively.

8. The assembly of claim 7, wherein the axial bore in the middle portion is about 5-10 μm less than the diameter of the stripped end of each fiber.

9. The assembly of claim 8, wherein the stripped end of each fiber has a diameter of about 125 μm.

10. The assembly of claim 9, wherein the axial bore diameter in the left and right portions is about 20 μm greater than the diameter of the coated portion of each fiber.

11. The assembly of claim 10, wherein the coated portion of each fiber has a diameter of about 250-900 μm.

12. The assembly of claim 7, wherein the axial bore of the splicer joint has a tapered section at the left and right ends for guiding the first and second fibers into the axial bore, respectively.

13. A splicer joint locking assembly for mechanically splicing together first and second optical fibers, each fiber having a coated portion and a stripped end with no coating terminating at a fiber tip, the assembly comprising:
(i) a splicer joint made from a slightly deformable plastic material, the splicer joint comprising:
a left end;
a right end; and
a mid-point between the left and right ends;
a variable diameter cylindrical exterior surface with equal cylindrical diameters at the left and right ends and a maximum cylindrical diameter at the mid-point, the exterior surface further having a raised ridge extending circumferentially around the cylindrical exterior surface at the mid-point; and
an axial bore extending from the left end to the right end, the axial bore having a middle portion running through the area of the mid-point, the axial bore in the middle portion having a diameter that is slightly less than the diameter of the stripped portion of each fiber;
the exterior of the splicer joint further defined by a left portion between the left end up to the mid-point and a right portion between the right end up to and including the mid-point;
the splicer joint for receiving the first fiber in the axial bore from the left end and the second fiber in the axial bore from the right end such that the stripped end of each fiber is frictionally received within the middle portion of the axial bore and the fiber tip of the first fiber is aligned with and abuts the fiber tip of the second fiber in the middle portion; and
(ii) a locking case for receiving the splicer joint, the locking case comprising:
a left section;
a right section; and
a snap-fit a locking mechanism for locking the left section to the right section when the sections are pushed toward one another, the locking mechanism comprising a circular lip extending around a peripheral portion on one end of the left section and a lip-receiving circular groove on one end of the right section;
the left section having an internal bore for receiving the first fiber, the bore including a tapered bore section forming a surface that is complementary to the exterior of the left portion of the splicer joint;
the right section having an internal bore for receiving the second fiber, the bore including a tapered internal bore section and a circumferential internal groove forming a surface that is complementary to the right portion of the splicer joint;
the left and right sections when locked together forming an internal surface that is complementary to the exterior surface of the splicer joint, with the exception that the internal surface at least in the area of the circumferential internal groove corresponding to the raised ridge has a dimension that is slightly less than the dimension of the raised ridge;
wherein, when the splicer joint carrying the first and second fibers is placed in the locking case and the left section is pushed toward and locked to the right section, the circumferential internal groove of the right section exerts a force on the raised ridge, which force locks the first and second fibers within the splicer joint.

14. The assembly of claim 13, wherein the tapered bores of the left and right sections have dimensions that are less than the dimensions of the corresponding areas of the left and right portions of the exterior of the splicer joint; and
wherein, when the splicer joint carrying the first and second fibers is placed in the locking case and the left section is pushed toward and locked to the right section, the tapered internal bore of the left section exerts a force on the left portion of the splicer joint;
the tapered internal bore of the right section exerts a force on the right portion and on the ridge, respectively.

15. The assembly of claim 14, wherein the axial bore further comprises:
a first bore portion between the first end and the middle portion; and
a second bore portion between the second end and the middle portion,
wherein the axial bore has a diameter in the first and second bore portions that is slightly greater than the diameter of the coating portion of the fibers;
the first bore portion for receiving a coated portion of the first fiber, and the second bore portion for receiving a coated portion of the second fiber.

16. The assembly of claim 15, wherein the axial bore in the middle portion is about 5-10 μm less than the diameter of the stripped portion of each fiber.

17. The assembly of claim 16, wherein the stripped portion of each fiber has a diameter of about 125 μm.

18. The assembly of claim 17, wherein the diameter of the first and second bore portions is about 20 μm greater than the diameter of the coated portion of each fiber.

19. The assembly of claim 18, wherein the coating portion of each fiber has a diameter of about 250-900 μm.

20. The assembly of claim 19, wherein the axial bore of the splicer joint has a tapered section at the left and right ends for guiding the first and second fibers into the axial bore, respectively.

21. A method of mechanically splicing together first and second optical fibers, each fiber having a coated portion and a stripped end with no coating terminating at a fiber tip, the method using the assembly of claim 1, the method comprising:
(a) inserting the first fiber into the axial bore of the splicer joint from the first end and inserting the second fiber into the axial bore from the second end such that the stripped end of each fiber is frictionally received within the middle portion of the axial bore and the fiber tip of the first fiber is aligned with and abuts the fiber tip of the second fiber in the middle portion;
(b) placing the splicer joint within locking case; and
(c) closing the locking case and locking the first section to the second section.

22. A method of mechanically splicing together first and second optical fibers, each fiber having a coated portion and a stripped end with no coating terminating at a fiber tip, the method using the assembly of claim 5, the method comprising:
(a) inserting the first fiber into the axial bore of the splicer joint from the left end and inserting the second fiber in the axial bore from the right end such that the stripped end of each fiber is frictionally received within the middle portion of the axial bore and the fiber tip of the first fiber is aligned with and abuts the fiber tip of the second fiber in the middle portion;
(b) placing the splicer joint within locking case; and
(c) closing the lid over the base and engaging the locking mechanism to lock the lid to the base.

23. A method of mechanically splicing together first and second optical fibers, each fiber having a coated portion and a stripped end with no coating terminating at a fiber tip, the method using the assembly of claim 13, the method comprising:
(a) inserting the first fiber through the internal bore in the left section of the locking case and into the axial bore of the splicer joint from the left end, and inserting the second fiber through the internal bore in the right section of the locking case and into the axial bore of the splicer joint from the right end such that the stripped end of each fiber is frictionally received within the middle portion of the axial bore and the fiber tip of the first fiber is aligned with and abuts the fiber tip of the second fiber in the middle portion; and
(b) pushing the left section and right section of the locking case toward one another to engage the snap-fit locking mechanism and lock the sections to one another.

24. A snap-fit assembly for mechanically locking a field optical fiber having a coated portion and a stripped end with no coating within a splice-on connector, the assembly comprising:
(i) a connector housing having a first end with an opening, and a second end, the second end having a cylindrical bore extending up to the first end, the cylindrical bore further having an internally oriented circumferential groove;
(ii) a ferrule/base subunit disposed in the opening of the first end, the subunit containing a fiber stub extending from the subunit into the cylindrical bore;
(iii) a locking ferrule formed from a slightly deformable plastic material disposed within the cylindrical bore, the locking ferrule having:
a first end attached to the ferrule/base subunit;
a second end disposed within the second open end of the housing;
a first axial bore receiving the fiber stub extending from the ferrule/base subunit, and for receiving the stripped end of the field fiber;
a second axial bore coaxial with the first axial bore, the second axial bore for receiving the coated portion of the field fiber; and
a tapered cylindrical exterior surface with a maximum outer diameter less than the diameter of the cylindrical bore, leaving an annular gap between the cylindrical bore of the housing and the exterior surface of the locking ferrule; and
(iv) a cylindrical cone shaped locking boot having an internal axial bore for receiving the field fiber and for engaging the locking ferrule, the locking boot having:
a first boot end having a diameter and wall thickness that permit the locking boot to be inserted into the annular gap;
a variable diameter and variable wall thickness along the longitude of the locking boot that cause the boot to exert an inward radially symmetric force on the locking ferrule as the boot is pushed into the annular gap;
the boot further comprising a raised ridge extending circumferentially around the exterior, the raised ridge for snap-fit locking within the internally oriented circumferential groove in the cylindrical bore of the housing when the boot is pushed a certain amount into the annular gap;
wherein, when the locking boot is pushed into the annular gap, the walls of the boot exert an inward radially symmetric force on the locking ferrule, which deforms the locking ferrule for exerting a force on the field fiber contained within the locking ferrule to lock the field fiber within the locking ferrule.

25. The snap-fit assembly of claim 24, wherein the splice-on connector is an angle-cleaved mechanical splice-on APC connector.

26. The snap-fit assembly of claim 24, wherein the splice-on connector is a flat-cleaved mechanical splice-on UPC connector.

* * * * *